Sept. 27, 1932.   J. H. AUSTIN   1,879,016
THRESHING MACHINE FOR TOBACCO
Filed Dec. 4, 1929

Inventor
J. H. Austin
By his Attorneys
Cooper, Kerr & Dunham

Patented Sept. 27, 1932

1,879,016

UNITED STATES PATENT OFFICE

JOSEPH H. AUSTIN, OF LOUISVILLE, KENTUCKY, ASSIGNOR TO P. LORILLARD COMPANY, OF NEW YORK, N. Y., A CORPORATION OF NEW JERSEY

THRESHING MACHINE FOR TOBACCO

Application filed December 4, 1929. Serial No. 411,448.

This invention pertains to apparatus and method for treating tobacco leaves for the purpose of separating the leaf lamina from the stem.

The apparatus in its preferred form comprises a number of threshing units and a single suction screening device. The material passes through the threshing units one after the other. The disintegration of the leaves increases at each unit, the separation of stems and lamina being complete before the final unit is passed.

While the successive threshing operations are taking place the material is subjected to a continuous up-draft of air which draws upwardly the particles of lamina as soon as they are separated from the less buoyant stems and fragments of stems. These particles of lamina are gathered on a moving screen through which the stream of air passes and are ultimately removed from the screen by a brush.

The stem fragments after passing through all the thresher units are discharged into a a waste spout.

The principal object of the invention is to greatly simplify the apparatus and methods heretofore used for the same purpose, particularly those disclosed in Patent No. 1,588,511, issued June 15, 1926 to Austin et al.

Further objects and advantages of the present invention will become apparent from the following description, claims and appended drawing in which:—

Figure 1:
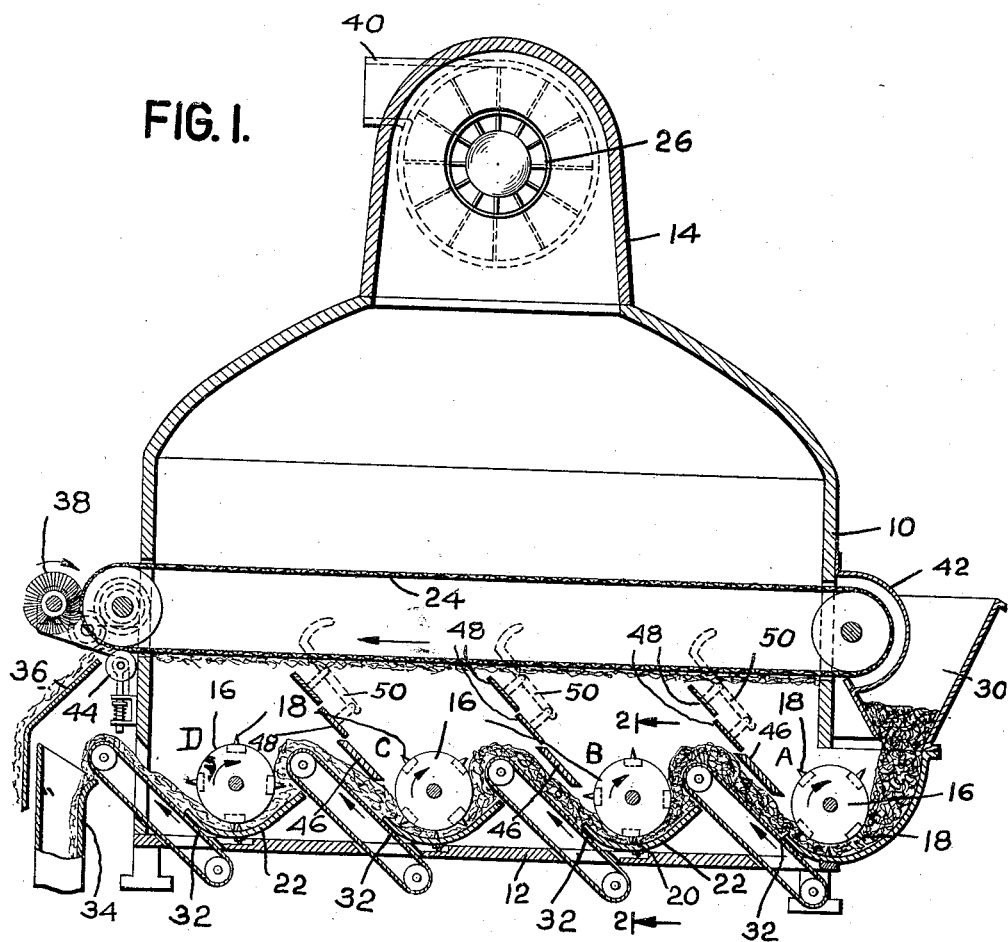
Fig. 1 shows a side view of the apparatus largely in cross-section.
Figure 2:
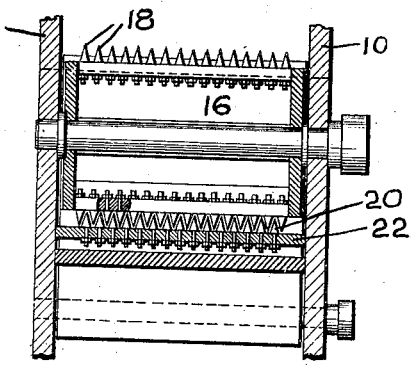
Fig. 2 is a view on line 2—2 of Fig. 1 showing details of teeth and arrangement thereof.

The apparatus includes a housing 10 having a floor 12 and a cupola 14. On the floor are a plurality of threshing units A, B, C, and D, each comprising a rotary cylinder 16 having on its surface a number of rows of teeth 18, which when the cylinder is rotated, pass between teeth 20, mounted in rows in concave 22.

Above the threshing units is a horizontal belt conveyor, the belt being formed of a perforated screen, the perforations being suitable to permit passage of air while preventing passage of particles of leaf lamina.

Above belt 24 in cupola 14 is a suction fan 26 which maintains an upward flow of air through openings in the lower part of housing 10 and through belt 24.

Bearing the above in mind operation of the apparatus will be readily understood. With all cylinders 16 rotating clockwise, belt 24 travelling as indicated by the arrow, and fan 26 running, leaves are fed into hopper 30. From hopper 30 they are drawn by teeth 18 on cylinder 16 of unit "A", past teeth 20 of the cooperating concave 22 and are broken up. The broken leaves are discharged onto an inclined conveyor 32 to be discharged therefrom between cylinder and concave of unit "B" where the disintegrating process is continued. In like manner the leaves are further broken up in units "C" and "D" and in as many more units as may be necessary. After each disintegrating operation, the lamina which have been separated from the stems are carried upwardly by the current of air induced by fan 26, leaving the stems to travel further through the threshing apparatus. By the time the last unit has been passed all lamina have been removed, and the stems are then discharged, by the last conveyor 32, into waste spout 34.

In the meantime, the lamina, held against conveyor 24 by the upwardly moving air are carried to the left as indicated by the arrow until they escape from the upward air current, whereupon they fall into discharge spout 36. A rotating brush 38 serves to brush from the conveyor into spout 26 any lamina which may still be adhering thereto when belt 24 begins its return journey into housing 10. Any dust carried past belt 24 will be discharged by fan 26 through pipe 40 and may be recovered if desired by any of the usual types of dust collectors.

A shield 42 is provided adjacent feed hopper 30 to prevent the raw material entering the hopper from coming into contact with belt 24. A spring pressed roller 44 holds belt 24 in close contact with its discharge drum.

In order to prevent material being thrown through the air from one cylinder to or beyond the next, cylinder plates 46 are provided to catch any such stray material and deflect it onto a belt 32 so that the material will reach the next cylinder in the proper manner.

Dampers 48 operable by handles 50 are placed at intervals across the machine above the cylinders and conveyor belts in order to regulate the drafts through the apparatus.

It is to be understood that the invention is not limited to the construction herein specifically illustrated but can be embodied in other forms without departure from its spirit.

I claim:

1. In apparatus of the class described, in combination, a housing, a plurality of threshing units in said housing, means for maintaining an upward draft of air through said housing, and means within the housing for conveying the tobacco from one unit to the next adjacent unit.

2. In apparatus of the class described, in combination, a housing, a plurality of threshing units in said housing, means within the housing for feeding tobacco leaves to said units in succession whereby the leaves are broken into fragments, and means for maintaining an upward draft of air through all of the units in said housing whereby the more buoyant of said particles are carried upwardly by said draft.

3. In apparatus of the class described, in combination, a housing, a plurality of threshing units in said housing, means within the housing for feeding tobacco leaves to said units in succession whereby the leaves are broken into fragments, means for maintaining an upward draft of air through all of the units in said housing whereby the more buoyant of said particles are carried upwardly by said draft, and a perforated conveyor belt in the path of said draft, whereby said buoyant particles are held against said belt by said draft while being transported by said belt.

4. In apparatus of the class described, in combination, a housing, a plurality of threshing units in said housing, means within the housing for feeding tobacco leaves to said units in succession, whereby the disintegration of said leaves increases progressively in said successive units, means for subjecting said leaves in all of the units constantly to an upward draft of air whereby the buoyant portions are separated from the stem portions of said leaves, and means for discharging said buoyant portions and said stem portions separately from the apparatus.

5. In apparatus of the class described, in combination, a housing, a plurality of threshing units in said housing, means within the housing for feeding tobacco leaves to said units in succession whereby the leaves are broken into fragments, means for maintaining an upward draft of air through all of the units in said housing whereby the more buoyant of said particles are carried upwardly by said draft and means for removing said buoyant particles from said draft.

6. The invention set forth in claim 5 in which said removing means comprises a perforated belt, substantially as described.

7. In apparatus of the class described, the combination with a housing and a plurality of threshing units in said housing, conveyors interposed between said units for feeding the tobacco leaves from one unit to the next adjacent unit, means interposed between the units for insuring successive treatment by the successive units, means for causing an upward draft of air through the various units, and means for regulating said draft.

8. In apparatus of the class described, the combination with a housing and a plurality of threshing units in said housing, conveyors interposed between said units for feeding tobacco leaves from one unit to the next adjacent unit, means interposed between the units for insuring successive treatment by the successive units, means for causing an upward draft of air through the various units, and means for independently regulating the draft through each unit.

In testimony whereof I hereto affix my signature.

JOSEPH H. AUSTIN.